May 29, 1956     E. DOLAR     2,747,388
COVERED DISH
Filed June 15, 1953

INVENTOR.
EDWARD DOLAR
BY Joshua R. H. Potts
HIS ATTORNEY.

United States Patent Office 2,747,388
Patented May 29, 1956

2,747,388

COVERED DISH

Edward Dolar, McHenry, Ill.

Application June 15, 1953, Serial No. 361,668

3 Claims. (Cl. 65—60)

This invention relates to improvements in condiment holders, and particularly to a dual chamber condiment holder for mustard, horseradish, and the like.

There are many types of condiment holders on the market today, ranging from small dishes with removable covers to flexible vinyl-type plastic bottles with small openings or conduits for "squirting" the condiment onto food. These are all, of course, useful but possess certain disadvantages which the present invention overcomes.

First of all, small dishes with removable covers present the inconvenience of necessarily handling separate dishes and covers for each condiment desired. Thus, it is necessary to take each dish separately and to remove its cover to find just what is in it, and if the particular condiment desired is not in the particular dish selected, it must be replaced and another dish examined. Furthermore, in dishes used for mustard, catsup and the like, it is not uncommon for the cover to become smeared with some of the contents from the dish, so that when the cover is removed and placed on the table, it leaves a mark on the tablecloth. Other condiment holders have metallic parts which are subject to rust, and some are made from glass which presents the hazard of breakage. Still others have no covers at all and therefore subject the contents to possible contamination.

Another type of condiment holder coming into common usage is the flexible vinyl-type bottle having a conduit therein for "squirting" its contents onto food. With this type of holder, it is often difficult to regulate the amount of the condiment emanating therefrom resulting in excessive waste thereof, and sometimes even spoiling the food.

It is an object of this invention, therefore, to provide an improved condiment holder.

It is another object of this invention to provide a non-rusting, non-breakable condiment holder.

It is still a further object of this invention to provide a unitary condiment holder having dual chambers therein with covers for said chambers which can be handled with ease and readily removed for cleaning.

These objects, together with some of the advantages to be derived in utilizing the present invention, will become apparent from the following detailed description, and from the accompanying drawings describing the preferred embodiment of this invention in which similar numerals refer to similar parts throughout the several views.

Figure 1:
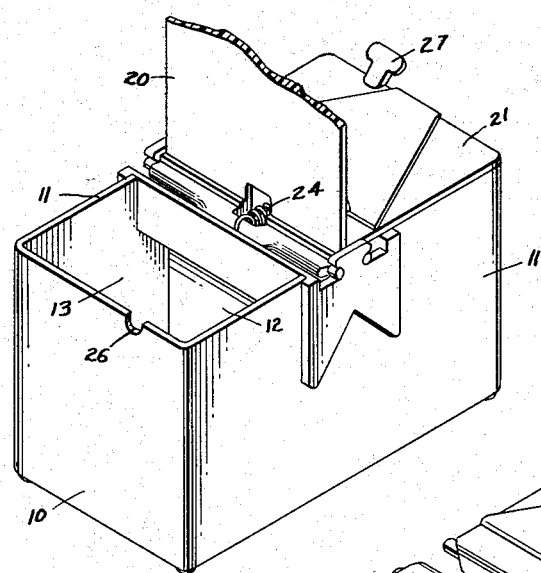
Figure 1 is a perspective view of the condiment holder of this invention showing one of the dual chambers therein and showing the covers in place.
Figure 2:
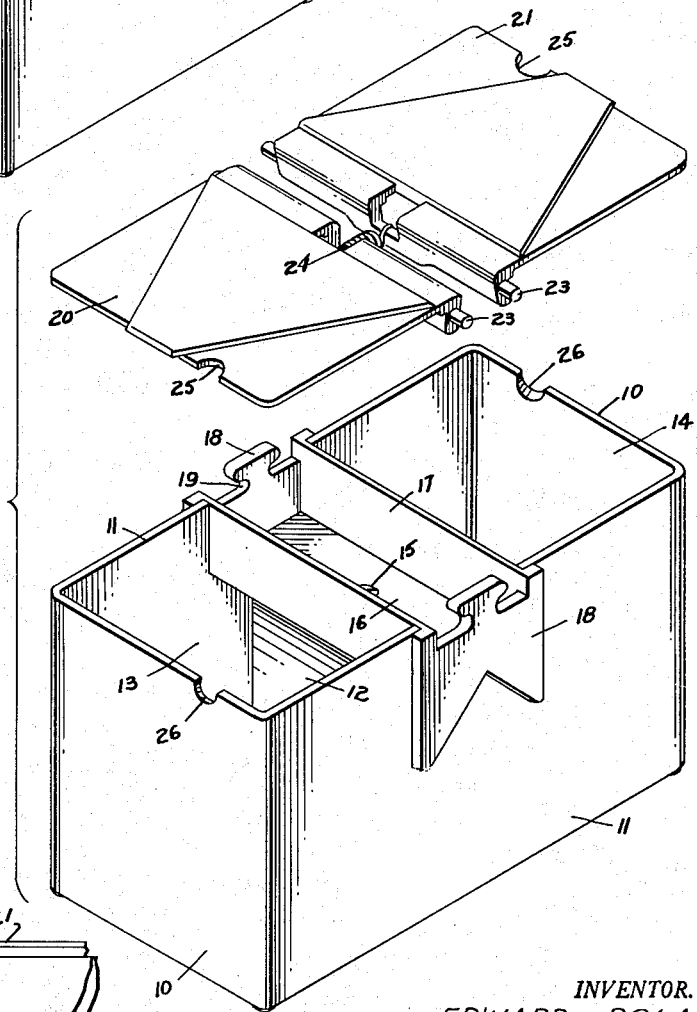
Figure 2 is an exploded view of the condiment holder in perspective showing both the dual chambers, the covers for said chambers, and the chamber for holding the hinge members of the covers.
Figure 3:
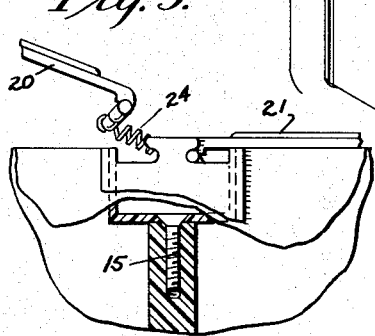
Figure 3 is a detail view, partly in section, showing how the cover hinge members are retained in the hinge chamber, and showing how the hinge chamber is attached to the main body of the condiment holder.

Referring to the drawings, the dual chamber condiment holder of this invention consists of a rectangular plastic body having side walls 10, front and rear walls 11, a closed bottom (not shown) and an open top. Midway the length of the rectangular body in perpendicular relationship to front and rear walls 11 is a partition 12, dividing the rectangular body into separate chambers 13 and 14, and terminating at a point below the top of the front and rear walls 11. Attached to the partition 12 by screw means 15, as shown in Figs. 2 and 3, is a cover retaining chamber consisting of a bottom 16, side walls 17, and front and rear walls 18. The front and rear walls 18 are provided with hinge-retaining slots 19.

Cooperating with the rectangular plastic body and covering the dual chambers 13 and 14 are plastic cover members 20 and 21 having laterally extending hinges 23, and joined together in restrained fashion by the coil spring 24. The cover members 20 and 21 are provided with notches 25, and the side walls 10 of the body of the condiment holder are similarly provided with notches 26 to permit the spatula 27 to be held in the chambers 13 and 14 when the covers are in closed relationship with the body of the holder.

The cover members 20 and 21 are removably mounted on the top of the condiment holder by inserting the hinges 23 in the hinge-retaining slots 19 provided therefor in the front and rear walls 18 of the cover retaining chamber, the said covers being held in place by the tension exerted by the coil spring 24.

In use, condiments such as mustard and horseradish may be placed in the chambers 13 and 14, respectively, and closed-off from exposure and contamination by the cover members 20 and 21. When one desires to use either the mustard or horseradish, one need merely flip either of the cover members upwardly whereupon it is held in the open position by the tension of the coil spring 24. Thus the inconvenience of trying to set the cover down on the table or holding it while trying to obtain mustard or the like from the holder is eliminated.

From the above description of this invention, it is apparent that a convenient and useful condiment holder is provided in a unitary structure which eliminates the disadvantages of known condiment holders, and which is easy to disassemble and clean and inexpensive to manufacture. This holder is preferably made from plastic so as to be light and relatively unbreakable, although other materials may be used with equal success.

Although the present discussion of this invention has been limited to the above-described preferred embodiment, other variations thereof are possible without departing from the spirit of the invention. It is therefore not intended that the invention be limited to the particular embodiment described but only to the inventive concept as defined in the appended claims.

What is claimed is:

1. A dual chamber condiment holder comprising, a box-like container having front, rear, and side walls, a bottom and an open top; a partition in said container in perpendicular relationship to said front and rear walls and bottom, dividing the container into two separate chambers; a hinge-retaining compartment provided by front and rear walls, side walls and a bottom, and having an open top, hinge pin slots in the front and rear walls of said hinge-retaining compartment, the said hinge-retaining compartment being fixedly attached to said partition; a pair of cover members having hinge pins removably mounted in said slots providing closures for said chambers; and a coil spring holding said hinge pins in said slots in restrained fashion.

2. A dual chamber condiment holder comprising, a box-like plastic container having front, rear, and side walls, a bottom and an open top, said side walls having notches therein near said open top for accommodating a spatula handle; a partition in said container in perpendicular relationship to said front and rear walls and bottom, dividing the container into two separate chambers; a plastic hinge-retaining compartment provided by front and rear walls, side walls and a bottom, and having an open top, hinge pin slots in the front and rear walls of said hinge-retaining compartment; the said hinge-retaining compartment being fixedly attached to said partition at the the open top of said containers; a pair of plastic cover members having hinge pins removably mounted in said slots providing closures for said chambers and having notches cooperating with the notches in the container side walls for accommodating a spatula handle; and a coil spring lying between said cover members with ends attached thereto holding said hinge pins in said slots in restrained fashion.

3. A dual chamber condiment holder comprising, a box-like container having front, rear, and side walls, a bottom and an open top; said side walls having notches therein for accommodating a spatula handle; a partition in said container in perpendicular relationship to said front and rear walls and bottom dividing the container into two separate chambers; said partition terminating at a point below said open top; a hinge-retaining compartment within said container and detachably attached to the top of said partition; said hinge-retaining compartment being provided by side walls, and front and rear walls, and a bottom, and having an open top; the front and rear walls of said hinge-retaining compartment each having a pair of aligned hinge slots; a pair of cover members each having a depending perpendicular flange along one edge thereof; a pair of aligned hinge pins projecting from the ends of said flanges; said flanges operating within the hinge-retaining compartment with the hinge pins being received in said hinge slots; and a tension spring joined to both said cover members and lying therebetween within said hinge-retaining chamber, said spring holding the hinge pins within the hinge slots.

References Cited in the file of this patent

UNITED STATES PATENTS

| 293,288 | Von Darteln | Feb. 12, 1884 |
|---|---|---|
| 470,870 | Lange | Mar. 15, 1892 |
| 483,101 | Burkhead | Sept. 20, 1892 |
| 698,943 | Heinz | Apr. 29, 1902 |
| 906,453 | McKoy | Dec. 8, 1908 |
| 918,115 | Baeder et al. | Apr. 13, 1909 |
| 1,463,452 | Baeder | Aug. 28, 1923 |
| 1,646,322 | Smith | Oct. 18, 1927 |
| 1,830,144 | Venago | Nov. 3, 1931 |
| 1,886,373 | Bracey | Nov. 8, 1932 |
| 2,446,742 | Crowell | Aug. 10, 1948 |
| 2,499,687 | Smith | Mar. 7, 1950 |
| 2,520,508 | Morrison | Aug. 29, 1950 |
| 2,613,518 | Karoff | Oct. 14, 1952 |

FOREIGN PATENTS

| 621 | Great Britain | Feb. 28, 1872 |
|---|---|---|
| 174,452 | Germany | Aug. 28, 1906 |
| 9,058 | Great Britain | Apr. 14, 1910 |
| 139,091 | Great Britain | Feb. 26, 1920 |
| 354,855 | Great Britain | Aug. 20, 1931 |